(12) United States Patent
Feng

(10) Patent No.: US 10,331,236 B2
(45) Date of Patent: Jun. 25, 2019

(54) WRITING IMPLEMENT

(71) Applicant: Shin Feng, Rowland Heights, CA (US)

(72) Inventor: Shin Feng, Rowland Heights, CA (US)

(73) Assignee: Shin Feng, Rowland Heights, CA (US)

( * ) Notice: Subject to any disclaimer, the term of this patent is extended or adjusted under 35 U.S.C. 154(b) by 216 days.

(21) Appl. No.: 15/390,467

(22) Filed: Dec. 24, 2016

(65) Prior Publication Data

US 2018/0178581 A1    Jun. 28, 2018

(51) Int. Cl.
  *G06F 3/0354* (2013.01)
  *B43K 5/16* (2006.01)
  *B43K 7/00* (2006.01)
  *B43K 8/00* (2006.01)
  *B43K 29/08* (2006.01)
  *B43K 5/00* (2006.01)

(52) U.S. Cl.
  CPC .......... *G06F 3/03545* (2013.01); *B43K 5/005* (2013.01); *B43K 7/005* (2013.01); *B43K 8/003* (2013.01); *B43K 29/08* (2013.01)

(58) Field of Classification Search
  CPC .... B43K 8/003; B43K 23/008; B43K 23/016; B43K 24/023; B43K 24/026; B43K 24/06; B43K 29/00; B43K 29/02
  USPC .............................. 401/96, 97, 110, 116, 195
  See application file for complete search history.

(56) References Cited

U.S. PATENT DOCUMENTS

| | | | | |
|---|---|---|---|---|
| 3,944,371 A * | 3/1976 | Schenk | ................ | B43K 24/06 |
| | | | | 401/110 |
| 4,025,204 A * | 5/1977 | Hobbs | .................. | B43K 24/06 |
| | | | | 401/109 |
| 4,983,062 A * | 1/1991 | Hour | ...................... | A63F 9/001 |
| | | | | 273/153 S |
| 5,281,039 A * | 1/1994 | Hsiung | .................. | A63F 7/042 |
| | | | | 273/113 |
| 5,584,195 A * | 12/1996 | Liu | ..................... | A44C 5/0007 |
| | | | | 401/131 |
| 6,158,914 A * | 12/2000 | Junkins | ................. | B43K 5/005 |
| | | | | 401/195 |
| D448,047 S * | 9/2001 | Lewis, Jr. | .................... | D19/174 |
| 6,612,766 B2 * | 9/2003 | Collins | ................. | B43K 7/005 |
| | | | | 401/195 |
| 6,739,780 B1 * | 5/2004 | Kuo | ....................... | B43K 5/005 |
| | | | | 401/195 |
| 6,752,556 B2 * | 6/2004 | Pearce | .................. | A46B 5/026 |
| | | | | 16/430 |
| 6,966,717 B1 * | 11/2005 | Kuo | ....................... | B43K 5/005 |
| | | | | 401/195 |
| 7,275,744 B1 * | 10/2007 | Kuo | ....................... | A63F 9/001 |
| | | | | 273/153 S |
| 7,780,499 B1 * | 8/2010 | Truckai | ................ | A63H 33/088 |
| | | | | 401/195 |
| 9,676,224 B2 * | 6/2017 | Gardner | ................ | B43K 8/003 |
| 9,789,727 B1 * | 10/2017 | Phillips | ................ | B43K 23/008 |
| D812,139 S * | 3/2018 | Feng | ............................ | D19/192 |

(Continued)

*Primary Examiner* — Joshua E Rodden

(57) ABSTRACT

A writing implement comprises first to n-th members (n is a natural number), an inner tube and a device of mechanism for projecting or retracting a writing tip connected to the first member, and the first to n-th members are stacked around the inner tube. Each of the first to n-th members is able to transmit rotational motion to the adjacent member. With such a structure, design quality can be improved. Also, it can provide a writing implement which attracts people even when they are not writing.

20 Claims, 4 Drawing Sheets

(56) References Cited

U.S. PATENT DOCUMENTS

| | | | |
|---|---|---|---|
| 2007/0041780 A1* | 2/2007 | Hsu | B43K 5/005 401/195 |
| 2007/0059089 A1* | 3/2007 | Junkins | B43K 5/005 401/195 |
| 2011/0038659 A1* | 2/2011 | Andochick | B43K 5/005 401/48 |
| 2017/0320352 A1* | 11/2017 | Mess | B43K 8/003 |
| 2018/0037050 A1* | 2/2018 | Marshall | B43K 29/004 |

* cited by examiner

WRITING IMPLEMENT

BACKGROUND OF THE INVENTION

1. Field of the Invention

The present invention relates to a writing implement.

2. Description of the Related Art

The writing implements are only focused on writing, so most of them are simple designs. When users hold a pen while thinking or talking, they have a tendency or habit to project and retract the writing tip repeatedly or even spins the pen to help boost focus, relieve stress or change their mood. However, in the case of a click mechanism pen, the life time of mechanism was reduced by excessive clicking and the loud noise generated by clicking distract others. On the other hand, a twist mechanism pen is muted when the writing tip is projected or retracted. However, the rotational load is so big that it is difficult for users to get the stress relief effect compared with a click mechanism pen.

SUMMARY OF THE INVENTION

It is an object of the present invention to provide a writing implement which improves a design quality with keeping the function of writing. It is still another object of the present invention to provide a writing implement which attracts people even when they are not writing.

In the present invention, a writing implement comprises first to n-th members (n is a natural number), an inner tube and a device of mechanism for projecting or retracting a writing tip connected to the first member, and the first to n-th members are stacked around the inner tube. Each of the first to n-th members is able to transmit rotational motion to the adjacent member.

In the above structure, the members may comprise concave and convex shape at the edge of touching to the adjacent member. Although these concave and convex shapes are not particularly limited, it is preferable that these are polygonal shape, trapezoid or arc.

In accordance with one aspect of the present invention, a writing implement comprises first to n-th members (n is a natural number), an inner tube and a device of mechanism for projecting or retracting a writing tip connected to the first member, and the first to n-th members are stacked around the inner tube. The m-th member (m is a natural number greater than 1 and less than n) is able to transmit rotational motion from (m−1)-th member to (m+1)-th member in order or from (m+1)-th member to (m−1)-th member in order.

In the above structure, the (m−1)-th member and the m-th member may comprise at least one paired concave and convex shapes, and the m-th member and the (m+1)-th member may comprise at least one paired concave and convex shapes. Although these concave and convex shapes are not particularly limited, it is preferable that these are polygonal shape, trapezoid or arc.

In accordance with one aspect of the present invention, a writing implement comprises first to n-th members (n is a natural number), an inner tube and a device of mechanism for projecting or retracting a writing tip connected to the first member, and the first to n-th members are located around the inner tube and stacked in order. The members are rotated in sequential order by rotating the first member and the writing tip projects.

In the above structure, the first to n-th members comprise concave and convex shapes at the edge. Although these concave and convex shapes are not particularly limited, it is preferable that it is polygonal shape, trapezoid or arc.

The above writing implements may comprise a function of stylus.

The present invention can provide a writing implement which has excellent design. Also, the present invention can provide a writing implement which attracts people even when they are not writing.

DETAILED DESCRIPTION OF THE INVENTION

Figure 1:
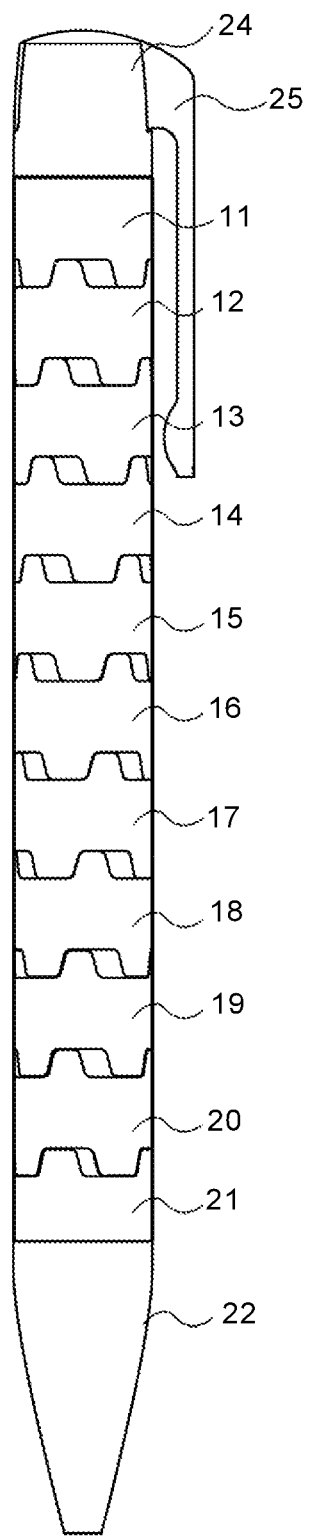
FIG. 1 is a side view showing an example of a writing implement of the present invention.

Embodiment modes of the present invention will be explained hereinafter with reference to the accompanying drawings. However, the present invention is not limited to the explanation below, and it is easily understood by those skilled in the art that modes and details of the present invention can be modified in various ways without departing from the purpose and the scope of the present invention. Therefore, the present invention should be construed as being included therein. Note that, in the structure of the present invention which will be hereinafter explained, reference numerals denoting the same portions are used in common between drawings in some cases.

Embodiment Mode

Figure 2:
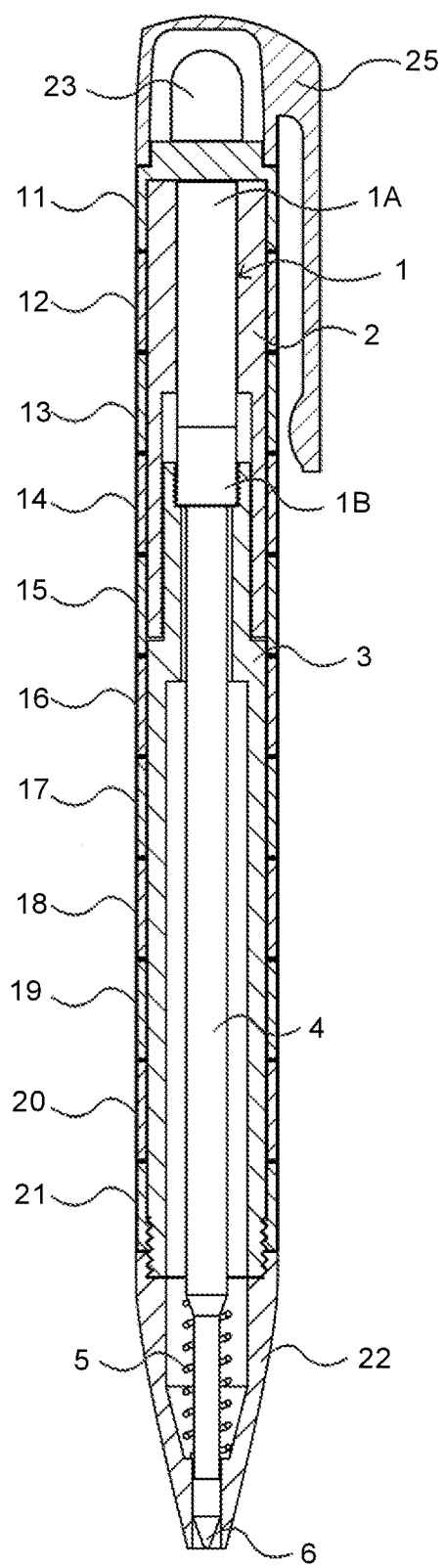
FIG. 2 is a cross-sectional view showing the writing implement illustrated in FIG. 1.
Figure 3:
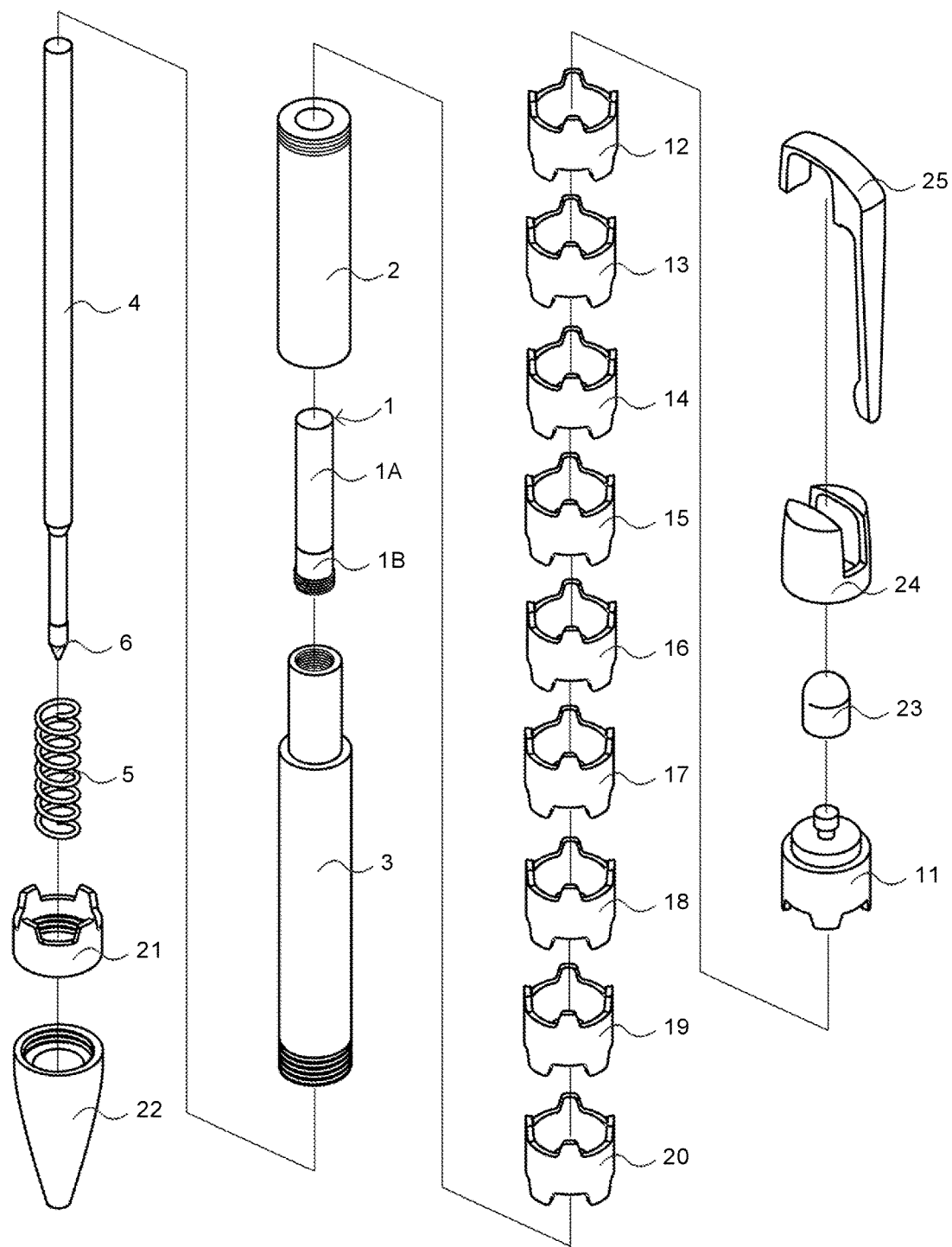
FIG. 3 is an exploded view showing the writing implement illustrated in FIG. 1.
Figure 4:
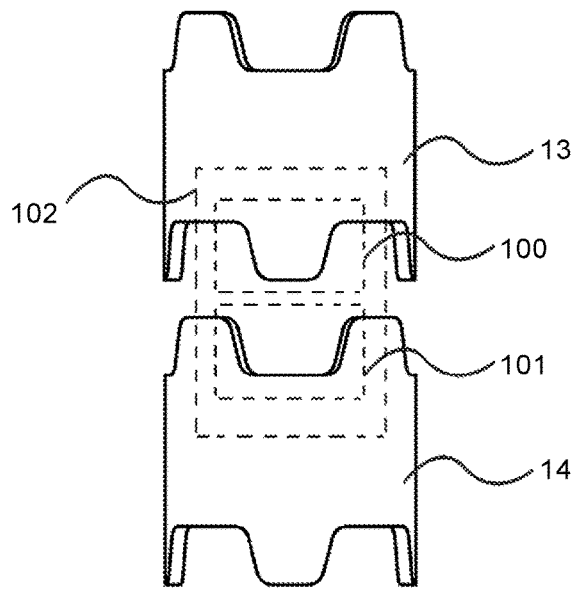
FIG. 4 is a side view of a third member and a fourth member which is an adjacent member of the third member.

An example of a writing implement of the present invention is described with reference to FIG. 1, FIG. 2 and FIG. 3. A side view, a cross-sectional view and an exploded view of the writing implement are shown in FIG. 1, FIG. 2 and FIG. 3, respectively. The writing implement shown in FIG. 1 includes a device of mechanism 1 for projecting or retracting a writing tip, a first inner tube 2, a second inner tube 3, a first member 11, a second member 12, a third member 13, a fourth member 14, a fifth member 15, a sixth member 16, a seventh member 17, an eighth member 18, a ninth member 19, a tenth member 20, a eleventh member 21 and a tip 22. The first to eleventh members are stacked around the inner tube in order, and each member comprises concave and convex shape at the edge of touching to the adjacent member. FIG. 4 is a side view of the third member 13 and the fourth member 14 which is the adjacent member of the third member 13. Each member comprises convex shape 100 and concave shape 101, and these are pair 102 between two members as shown in FIG. 4. Note that the area of convex shape 100 is smaller than that of concave shape 101 in each pair and each member is able to rotate.

The device of mechanism 1 is located inside of the first inner tube 2 and the second inner tube 3. The top mechanism 1A of the device of mechanism 1 is pressed into the first member 11 which is fixed with the first inner tube 2, and the first member 11 rotates with the top mechanism 1A. The bottom mechanism 1B of the device of mechanism 1 secured by screwing to the second inner tube 3. Note that the first inner tube 2 and second inner tube 3 may overlap partially or not. The second inner tube 3 is screwed with the eleventh member 21. A refill 4 filled with ink is connected with the refill accepter which is inside of the device of mechanism 1, is in serted into coil 5, and is housed within the writing implement by screwing between the tip of the second inner tube 3 and the tip 22.

By rotating the first member 11, the adjacent members rotate in order and a writing tip 6 projects. Alternatively, the writing tip 6 may project by rotating the last of the number which is the eleventh number 21.

Note that the writing implement may have a function of stylus. In a case where it is a capacitive stylus, the writing implement comprises a member 23 of conductive material over the first member 11. Although the materials of the writing implement are not particularly limited, the materials between the member 23 and the position, where users touch it with their hand when they use it as a stylus, need to be metals. When they don't use it as a stylus, the member 23 is covered with a cap 24 which comprises a clip 25.

Such a writing implement of the present invention can improve the design quality with the members, and spaces between them, that is, surface of the inner tube. Further, since the members except first and last member can be rotated anytime with one or both hands, users can reduce their stress and be relaxed by playing with them. It also encourages a change of mood for users. Thus, it attracts people even when they are not writing.

Figure 5A:
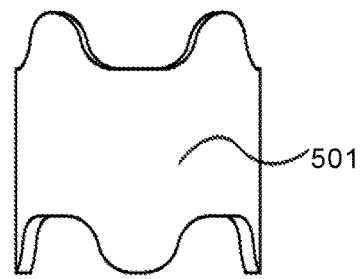
FIG. 5A, FIG. 5B and FIG. 5C are side views of other examples of members.
Figure 5B:
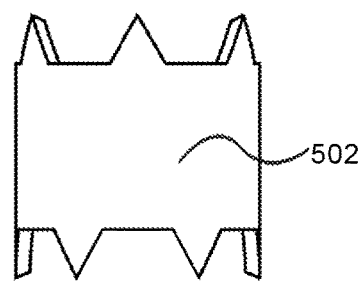
Figure 5C:
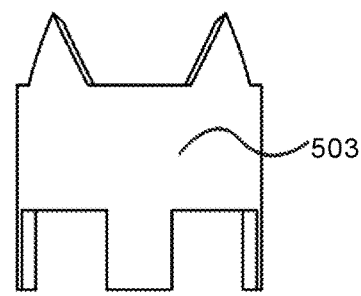

Note that the members are not particularly limited as long as they are able to transmit rotational motion to the adjacent member. For example, the concave and convex shape of the member is not limited to trapezoid shape, they may be arc as a member 501 shown in FIG. 5A or polygonal as a member 502 shown in FIG. 5B. The concave and convex shape is also not limited to one type, and it may be combined with the other type as a member 503 shown in FIG. 5C.

Although FIGS. 1 to 3 illustrate the example which the members are same, each of members may be different shapes. Needless to say, the number of members, the number of the pair between two members and the length of each member in axial direction are also not limited. Note that when the members are same shape, it is possible to suppress the increase of manufacturing costs with increase in the number of components.

Figure 6:
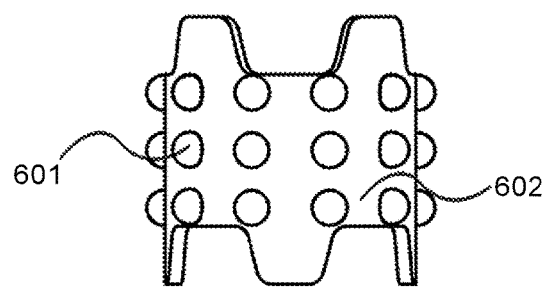
FIG. 6 is a side view of other example of members.

The surface of the member also does not need to be flat. It may have bumps 601 as a member 602 shown in FIG. 6. In this case, users can massage themselves by rolling or squeezing the writing implement of the present invention in their hands. It also creates a soothing sensation.

Note that the writing implement as shown in FIG. 1 is also able to rearrange the order of the members or change the member because the inner tube can separate into the first inner tube 2 which has the first member and the second inner tube 3 which has the last member. This is also one of the attractions.

Note that the mechanism of the writing implement is not limited to the twist mechanism. Any mechanism can be used as long as the members are rotated in sequential order when the writing tip projects.

Note also that the structure of writing implement is not limited to the above-described structure. For example, the tip 22 and the last of the number which is the eleventh number 21 may be one component.

Thus, the present invention can provide a writing implement which has excellent design. Also, the present invention can provide a writing implement which attract people even when they are not writing.

The invention claimed is:

1. A writing implement comprising:
first to n-th members (n is a natural number);
an inner tube; and
a device comprising a mechanism connected to said first member, for projecting or retracting a writing tip,
wherein said first to n-th members are stacked around said inner tube,
wherein said inner tube is always partially exposed between said members,
wherein said first to n-th members are able to rotate separately,
wherein each of said first to n-th members is able to transmit rotational motion to an adjacent one of said first to n-th members after delay.

2. A writing implement according to claim 1,
wherein said first to n-th members comprise concave and convex shape at an edge of touching to said adjacent one of said first to n-th members.

3. A writing implement according to claim 1,
wherein said first to n-th members comprise concave and convex shape at an edge of touching to said adjacent one of said first to n-th members,
Wherein area of said concave shape is larger than area of said convex shape of the edge of said adjacent one of said first to n-th members.

4. A writing implement according to claim 1,
wherein said first to n-th members comprise concave and convex shape at an edge of touching to said adjacent one of said first to n-th members,
Wherein said convex shape is polygonal shape.

5. A writing implement according to claim 1,
wherein said first to n-th members comprise concave and convex shape at an edge of touching to said adjacent one of said first to n-th members,
Wherein said convex shape is trapezoid.

6. A writing implement according to claim 1,
wherein said first to n-th members are same shape and comprise concave and convex shape at an edge of touching to said adjacent one of said first to n-th members.

7. A writing implement according to claim 1,
wherein a surface of one or more said members comprise bumps.

8. A writing implement according to claim 1,
wherein said mechanism is a twist mechanism.

9. A writing implement according to claim 1,
further comprising a function of stylus.

10. A writing implement comprising:
first to n-th members (n is a natural number);
an inner tube; and
a device comprising a mechanism connected to said first member, for projecting or retracting a writing tip,
wherein said first to n-th members are stacked around said inner tube,
wherein said inner tube is always partially exposed between said members,
wherein a m-th member (m is a natural number greater than 1 and less than n) of said members is able to transmit rotational motion from (m−1)-th member to (m+1)-th member in sequential order or from (m+1)-th member to (m−1)-th member in sequential order,
wherein said (m−1)-th member, said m-th member and said (m+1)-th member are able to rotate separately.

11. A writing implement according to claim 10,
wherein said (m−1)-th member and said m-th member comprise at least one paired concave and convex shape, wherein said m-th member and said (m+1)-th member comprise at least one paired concave and convex shape.

12. A writing implement according to claim 10,
wherein said (m−1)-th member and said m-th member comprise at least one paired concave and convex shape,
wherein said m-th member and said (m+1)-th member comprise at least one paired concave and convex shape,
wherein said convex shape is polygonal shape.

13. A writing implement according to claim 10,
wherein said (m−1)-th member and said m-th member comprise at least one paired concave and convex shape,
wherein said m-th member and said (m+1)-th member comprise at least one paired concave and convex shape,
wherein said convex shape is trapezoid.

14. A writing implement according to claim 10,
wherein said (m−1)-th member and said m-th member comprise at least one paired concave and convex shape and area of said convex of (m−1)-th member is smaller than area of said concave of m-th member in said pair,
wherein said m-th member and said (m+1)-th member comprise at least one paired concave and convex shape and area of said convex of m-th member is smaller than area of said concave of (m+1)-th member in said pair.

15. A writing implement according to claim 10,
further comprising a function of stylus.

16. A writing implement comprising:
first to n-th members (n is a natural number);
an inner tube; and
a device comprising a mechanism connected to said first member, for projecting or retracting a writing tip,
wherein said first to n-th members are located around said inner tube and stacked in order,
wherein said inner tube is always partially exposed between said members,
wherein said first to n-th members are able to rotate separately,
wherein said members are rotated in sequential order by rotating said first member and said writing tip projects.

17. A writing implement according to claim 16,
wherein said first to n-th members comprise concave and convex shape at an edge.

18. A writing implement according to claim 16,
wherein said first to n-th members comprise concave and convex shape at an edge,
wherein said convex shape is polygonal shape.

19. A writing implement according to claim 16,
further comprising a function of stylus.

20. A writing implement according to claim 10,
wherein said (m−1)-th member and said m-th member comprise at least one paired concave and convex shape,
wherein said m-th member and said (m+1)-th member comprise at least one paired concave and convex shape,
wherein exposed portions of said inner tube exist between said paired concave and convex shape.

* * * * *